United States Patent
Yang et al.

(10) Patent No.: US 12,001,546 B2
(45) Date of Patent: Jun. 4, 2024

(54) SYSTEMS AND METHODS FOR CAUSALITY-BASED MULTIVARIATE TIME SERIES ANOMALY DETECTION

(71) Applicant: Salesforce, Inc., San Francisco, CA (US)

(72) Inventors: Wenzhuo Yang, Singapore (SG); Chu Hong Hoi, Singapore (SG); Kun Zhang, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 297 days.

(21) Appl. No.: 17/514,487

(22) Filed: Oct. 29, 2021

(65) Prior Publication Data
US 2022/0382856 A1 Dec. 1, 2022

Related U.S. Application Data

(60) Provisional application No. 63/194,035, filed on May 27, 2021.

(51) Int. Cl.
*G06F 21/55* (2013.01)
*G06N 20/00* (2019.01)

(52) U.S. Cl.
CPC ............ *G06F 21/55* (2013.01); *G06N 20/00* (2019.01); *G06F 2221/032* (2013.01)

(58) Field of Classification Search
CPC .. G06F 21/55; G06F 2221/032; G06F 18/214; G06F 2221/034; G06F 21/577; G06F 18/217; G06N 20/00; H04L 63/1425
See application file for complete search history.

(56) References Cited

U.S. PATENT DOCUMENTS

| | | | |
|---|---|---|---|
| 11,018,959 B1 * | 5/2021 | Neill | H04L 43/026 |
| 11,556,636 B2 * | 1/2023 | Neil | G06F 21/554 |
| 11,860,971 B2 * | 1/2024 | Buda | G06N 5/04 |
| 2018/0018588 A1 * | 1/2018 | Dalton | G06Q 10/067 |
| 2018/0329932 A1 * | 11/2018 | Chen | G06F 21/552 |

(Continued)

OTHER PUBLICATIONS

Choi et al., "GAN-Based Anomaly Detection and Localization of Multivariate Time Series Data for Power Plant," 2020 IEEE International Conference on Big Data and Smart Computing (BigComp) Year: 2020 | Conference Paper | Publisher: IEEE.*

(Continued)

*Primary Examiner* — Roderick Tolentino
(74) *Attorney, Agent, or Firm* — Haynes and Boone, LLP

(57) ABSTRACT

Embodiments described herein provide a causality-based anomaly detection mechanism that formulates multivariate time series as instances that do not follow the regular causal mechanism. Specifically, the causality-based anomaly detection mechanism leverages the causal structure discovered from data so that the joint distribution of multivariate time series is factorized into simpler modules where each module corresponds to a local causal mechanism, reflected by the corresponding conditional distribution. Those local mechanisms are modular or autonomous and can then be handled separately. In light of this modularity property, the anomaly detection problem then naturally decomposed into a series of low-dimensional anomaly detection problems. Each subproblem is concerned with a local mechanism.

20 Claims, 12 Drawing Sheets

(56) References Cited

U.S. PATENT DOCUMENTS

| | | | |
|---|---|---|---|
| 2019/0197425 A1* | 6/2019 | Yuan | G06F 17/15 |
| 2021/0097052 A1* | 4/2021 | Hans | G06N 5/01 |
| 2021/0165704 A1* | 6/2021 | Savir | G06F 11/079 |
| 2022/0066906 A1* | 3/2022 | Kumar | G06F 11/302 |
| 2022/0358212 A1* | 11/2022 | Dixit | G06F 21/552 |

OTHER PUBLICATIONS

Tchatchoua et al., "A Comparative Evaluation of Deep Learning Anomaly Detection Techniques on Semiconductor Multivariate Time Series Data," 2021 IEEE 17th International Conference on Automation Science and Engineering (CASE) Year: 2021 | Conference Paper | Publisher: IEEE.*

* cited by examiner

Algorithm 1 Causality-based anomaly detection algorithm

Input: training data $\mathcal{X} = \{x_i\}_{i=1}^{d} \in \mathbb{R}^{T \times d}$, test data $\mathcal{Y} = \{y_i\}_{i=1}^{d} \in \mathbb{R}^{\hat{T} \times d}$, and threshold $\lambda$;

Procedure:

Training procedure:
1) Infer the causal graph $\mathcal{G}$ via causal discovery techniques. If the $\mathcal{G}$ is a partial DAG, convert it into a DAG by the method
2) For each variable $x_i \notin \mathcal{C}_\mathcal{R}$, train the model $\mathcal{M}_i$ that estimates the conditional distribution $\mathbb{P}[x_i(t)|\mathcal{P}(x_i(t))]$ with data $\{x_i(t), \mathcal{P}(x_i(t))\}_{t=1}^{T}$
3) For the variables in $\mathcal{C}_\mathcal{R}$, train the model $\mathcal{M}_\mathcal{R}$ that estimates the distribution $\prod_{i \in \mathcal{C}_\mathcal{R}} \mathbb{P}[x_i(t)]$ with data $\{x_i(t)|i \in \mathcal{C}_\mathcal{R}\}_{t=1}^{T}$;

Detection procedure:

for $t = 1$ to $\hat{T}$ do
    4) Compute anomaly score $A(y(t)) = 1 - \min\{\{\mathcal{M}_i(y(t))|i \notin \mathcal{C}_\mathcal{R}\} \cup \mathcal{M}_\mathcal{R}(y(t))\}$;
    5) Set anomaly label $l_t = 1$ if $A(y(t)) > \lambda$ or 0 otherwise;
end for

*FIG. 3A*

| Methods | Linear, Measurement | | | Linear, Intervention | | | Linear, Effect | | |
|---|---|---|---|---|---|---|---|---|---|
| | Precision | Recall | F1 | Precision | Recall | F1 | Precision | Recall | F1 |
| IF | 0.264 | 0.640 | 0.374 | 0.294 | 0.640 | 0.403 | 0.148 | 0.428 | 0.220 |
| AE | 0.312 | 0.504 | 0.386 | 0.281 | 0.497 | 0.359 | 0.165 | 0.437 | 0.240 |
| VAE | 0.272 | 0.463 | 0.343 | 0.249 | 0.481 | 0.328 | 0.141 | 0.392 | 0.208 |
| LSTM-VAE | 0.346 | 0.673 | 0.457 | 0.472 | 0.438 | 0.454 | 0.622 | 0.397 | 0.485 |
| DAGMM | 0.732 | 0.760 | 0.746 | 0.603 | 0.492 | 0.542 | 0.742 | 0.701 | 0.721 |
| USAD | 0.172 | 0.471 | 0.252 | 0.204 | 0.360 | 0.260 | 0.170 | 0.310 | 0.220 |
| Causality-based | 0.721 | 0.819 | 0.767 | 0.672 | 0.866 | 0.757 | 0.753 | 0.727 | 0.740 |

| Methods | Nonlinear, Measurement | | | Nonlinear, Intervention | | | Nonlinear, Effect | | |
|---|---|---|---|---|---|---|---|---|---|
| | Precision | Recall | F1 | Precision | Recall | F1 | Precision | Recall | F1 |
| IF | 0.284 | 0.416 | 0.336 | 0.323 | 0.608 | 0.422 | 0.264 | 0.603 | 0.367 |
| AE | 0.304 | 0.550 | 0.392 | 0.320 | 0.499 | 0.390 | 0.254 | 0.637 | 0.363 |
| VAE | 0.305 | 0.565 | 0.396 | 0.395 | 0.362 | 0.377 | 0.224 | 0.485 | 0.306 |
| LSTM-VAE | 0.582 | 0.580 | 0.581 | 0.565 | 0.526 | 0.545 | 0.310 | 0.535 | 0.393 |
| DAGMM | 0.587 | 0.354 | 0.456 | 0.591 | 0.587 | 0.589 | 0.243 | 0.687 | 0.359 |
| USAD | 0.307 | 0.398 | 0.346 | 0.237 | 0.414 | 0.302 | 0.225 | 0.367 | 0.279 |
| Causality-based | 0.738 | 0.777 | 0.757 | 0.724 | 0.798 | 0.759 | 0.709 | 0.578 | 0.637 |

*FIG. 5*

| Methods | SWaT | | | WADI | | | SMD | | |
|---|---|---|---|---|---|---|---|---|---|
| | Prec. | Recall | F1 | Prec. | Recall | F1 | Prec. | Recall | F1 |
| IF | 0.998 | 0.669 | 0.801 | 0.541 | 0.794 | 0.644 | 0.796 | 0.997 | 0.885 |
| AE | 0.999 | 0.656 | 0.792 | 0.595 | 0.762 | 0.668 | 0.879 | 0.997 | 0.934 |
| VAE | 0.999 | 0.656 | 0.792 | 0.616 | 0.855 | 0.716 | 0.853 | 0.999 | 0.921 |
| LSTM-VAE | 0.997 | 0.689 | 0.815 | 0.658 | 0.920 | 0.767 | 0.931 | 0.998 | 0.963 |
| DAGMM | 0.829 | 0.767 | 0.797 | 0.639 | 0.501 | 0.412 | 0.704 | 0.998 | 0.825 |
| OmniAnomaly | 0.722 | 0.983 | 0.833 | 0.265 | 0.980 | 0.417 | 0.981 | 0.943 | 0.944 |
| USAD | 0.987 | 0.740 | 0.846 | 0.645 | 0.322 | 0.430 | 0.931 | 0.962 | 0.938 |
| Causality-based | 0.945 | 0.892 | 0.918 | 0.749 | 0.901 | 0.818 | 0.886 | 0.999 | 0.939 |
| (std) | ±0.009 | ±0.016 | ±0.008 | ±0.021 | ±0.029 | ±0.023 | ±0.004 | ±0.000 | ±0.002 |

*FIG. 6*

| SWaT ($\mathcal{G}$ has 102 edges and 5 nodes with no parents) | | | | | | |
|---|---|---|---|---|---|---|
| $\mathcal{M}_\mathcal{R}$ | Precision | Recall | F1 score | Precision* | Recall* | F1 score* |
| ∅ | 0.952 | 0.874 | 0.911 | 0.950 | 0.929 | 0.940 |
| IF | 0.947 | 0.893 | 0.919 | 0.946 | 0.945 | 0.945 |
| AE | 0.958 | 0.900 | 0.928 | 0.963 | 0.920 | 0.941 |
| LSTM-VAE | 0.954 | 0.874 | 0.912 | 0.951 | 0.936 | 0.944 |
| WADI ($\mathcal{G}$ has 249 edges and 17 nodes with no parents) | | | | | | |
| $\mathcal{M}_\mathcal{R}$ | Precision | Recall | F1 score | Precision* | Recall* | F1 score* |
| ∅ | 0.749 | 0.920 | 0.826 | 0.873 | 0.979 | 0.923 |
| IF | 0.738 | 0.920 | 0.819 | 0.948 | 0.920 | 0.934 |
| AE | 0.789 | 0.920 | 0.850 | 0.931 | 0.979 | 0.955 |
| LSTM-VAE | 0.748 | 0.920 | 0.825 | 0.949 | 0.920 | 0.934 |

FIG. 7

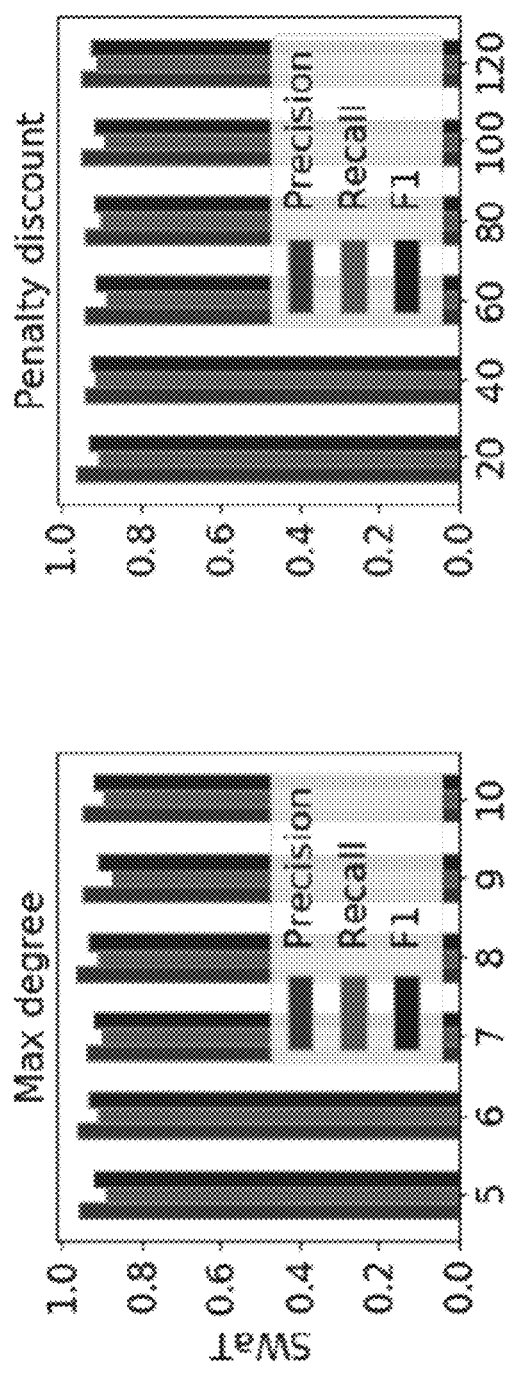
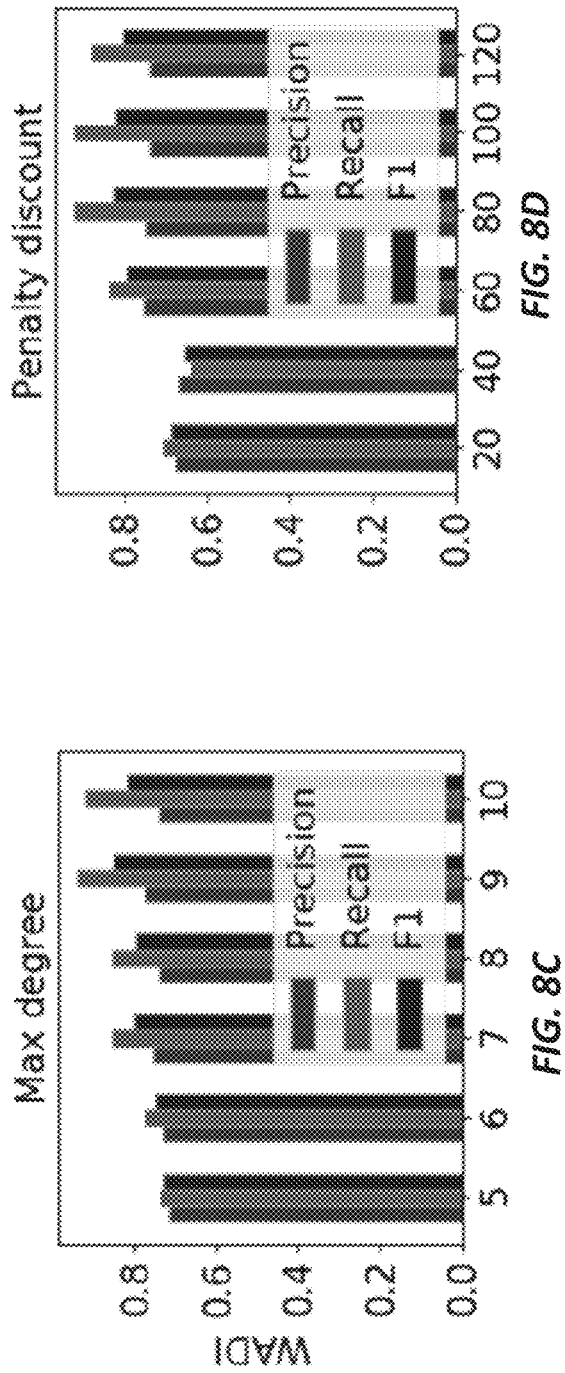
FIG. 8A  FIG. 8B  FIG. 8C  FIG. 8D

SYSTEMS AND METHODS FOR CAUSALITY-BASED MULTIVARIATE TIME SERIES ANOMALY DETECTION

CROSS REFERENCE(S)

The instant application is a nonprovisional of and claims priority under 35 U.S.C. 119 to commonly-owned U.S. provisional application No. 63/194,035, filed on May 27, 2021, which is hereby expressly incorporated herein by reference in its entirety.

TECHNICAL FIELD

The embodiments relate generally to machine learning systems and anomaly detection, and more specifically to systems and methods for causality-based multivariate time series anomaly detection.

BACKGROUND

Complex systems in real world applications, such as IT operations management, manufacturing industry and cyber security, often need to monitor system behavior in the form of multivariate time series data. Such data includes the measurements of the monitored components, e.g., the operational KPI metrics such as CPU/database usages in an IT system, and/or the like. An important task in managing these complex systems is to detect unexpected observations that deviate from normal behaviors and then to notify the operators timely to resolve the underlying issues. The task of anomaly detection in multivariate time series aims to tackle this issue. Some existing systems adopt machine learning techniques to automate the identification of issues and incidents for improving system availability.

Therefore, there is a need for efficient and accurate multivariate time series anomaly detection.

BRIEF DESCRIPTION OF THE DRAWINGS

FIG. 3A is a simplified diagram illustrating pseudo-code for a causality-based anomaly detection algorithm, according to embodiments described herein.

FIGS. 5-9 provide data charts illustrating example performance results of the causality-based anomaly detection mechanism described in FIGS. 1A-4, according to some embodiments described herein.

Figure 1B:
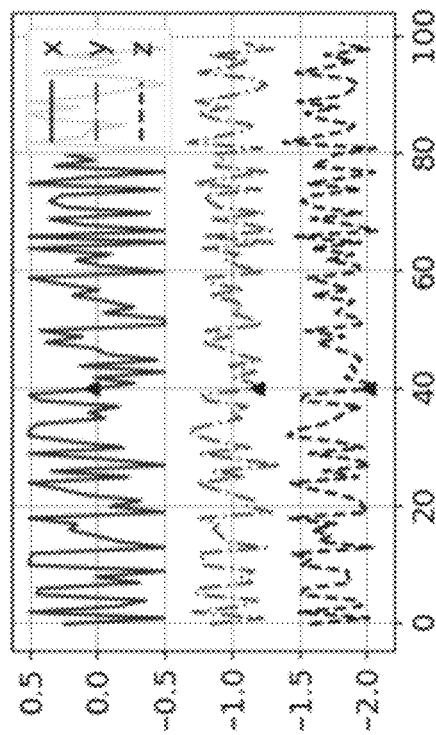
FIG. 1B is a simplified diagram illustrating example measurements of three time series variables, according to one embodiment described herein.

In the figures, elements having the same designations have the same or similar functions.

DETAILED DESCRIPTION

Anomaly detection in multivariate time series plays an important role in monitoring the behaviors of various real-world systems, e.g., IT system operations or manufacturing industry. Some existing systems have adopted machine learning techniques to detect anomalies in multivariate time series data. For example, some existing systems may treat each performance metric individually using univariate time series anomaly detection algorithms, or alternatively treat all the performance metrics as an entity using multivariate time series anomaly detection algorithms. The former technique ignores the dependence between different time series, so it may be inaccurate especially when sudden changes of a certain metric do not necessarily mean failures of the whole system or the relations among the time series become anomalous. The latter approach takes the dependence into consideration, which are more suitable for real-world applications where the overall status of a system is more concerned about than a single measurement.

On the other hand, in real-world scenarios, it is common that no or very few anomaly labels are available in historical data, making unsupervised multivariate time series anomaly detection algorithms more practical. Example techniques include clustering-based methods, probabilistic methods and classification-based method. Deep learning techniques such as DAGMM, LSTM-VAE and OmniAnomaly are configured to infer dependence between different time series and temporal patterns within one time series implicitly. However, most of deep learning based methods exploit complex models and require a significant amount of time for training. The dependence inferred by deep learning models do not represent the underlying process of generating the observed data and the asymmetric causal relationships between time series are ignored so that the learned representations might not be appropriate for anomaly detection. In addition, it remains challenging for the deep learning systems to identify the root causes when an anomaly occurs.

In view of the various deficiencies with existing anomaly detection methods, embodiments described herein provide a causality-based anomaly detection mechanism that formulates multivariate time series as instances. Specifically, a causal graph is determined from a multivariate time series input, which describes the causal relationship between a plurality of causal variables in the multivariate time series input. A subset of causal variables are than derived as having no causal parents in the causal graph. A causal structure of the multivariate time series can then be determined based on the subset of causal variables. The causal structure can then be served as a condition for a machine learning model to predict a conditional distribution of the multivariate time series, which is used to train the machine learning model.

In this way, unlike existing anomaly detection systems, the causality-based anomaly detection mechanism formulates and tackles multivariate anomaly detection from the causality perspective by leveraging the causal structure discovered from data so that the joint distribution of multivariate time series is factorized into simpler modules where each module corresponds to a local causal mechanism, reflected by the corresponding conditional distribution. Those local mechanisms are modular or autonomous and can then be handled separately. In light of this modularity property, the anomaly detection problem then naturally decomposed into a series of low-dimensional anomaly detection problems. Each sub-problem is concerned with a local mechanism. The decomposability of the anomaly detection problem also helps to decompose the training complexity, which improves computational efficiency in training for real world applications and in particular for root cause analysis.

In one embodiment, because the causality-based anomaly detection mechanism focuses on issues with the separate local causal mechanisms, the mechanism is able to identify the root causes of an anomaly at the same time.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1D:
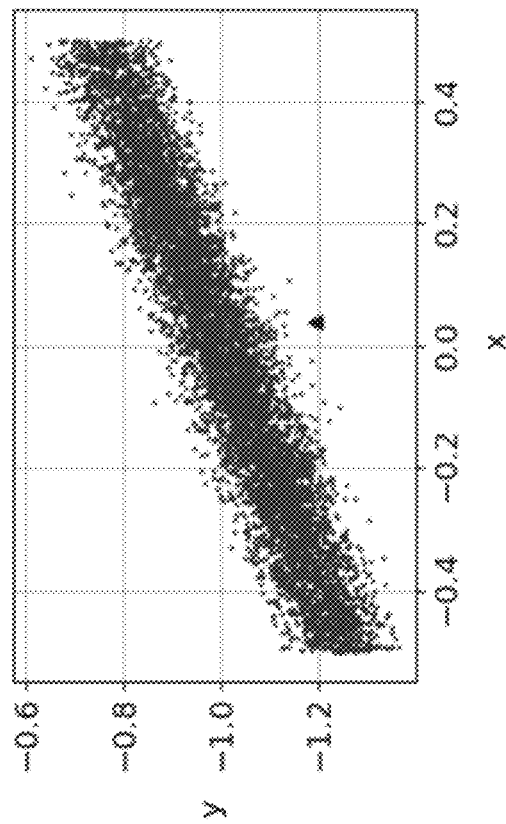
FIG. 1D is a simplified diagram illustrating an example visualization of the causal mechanism between the variables, according to one embodiment described herein.
Figure 1A:
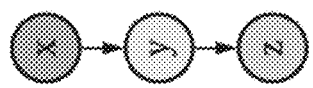
FIG. 1A is a simplified diagram illustrating an example causal structure of multivariate time series variables, according to one embodiment described herein.

FIG. 1A is a simplified diagram illustrating an example causal structure of multivariate time series variables, according to one embodiment described herein. A multivariate time series, represented by X with length of a period of time T and a number d variables, i.e., $X=\{x_1, x_2, \ldots, x_d\} \in \mathbb{R}^{T \times d}$ may be the measurements (such as voltage, current, signal strength, and/or the like) of system parameters over a period of time. Let $x_i(t)$ be the observation of the ith variable measured at time t. Anomaly detection is the task of identifying anomalies at a certain time instance that differ from the regular points in X significantly.

The measurements of time-series variables can often be related, or have a causal relationship. For example, in IT operation management systems, the variable "sensor_alert" may be caused by the value of variable "sensor_peak_current." In FIG. 1A, the measurements of three components 100 x, y, z with causal structure x→y→z are shown. For example, The causal mechanism between x, y, z is $y=0.5x+\varepsilon_1$, $z=\tanh(y^2-y)+\varepsilon_2$.

If the causal structure (as shown FIG. 1A) of the underlying process is given, it may be determined whether each variable in the time series follows its regular causal mechanism. The causal mechanism can be represented by a structural equation model, i.e., $$x_i(t)=f_i(\mathcal{P}(x_i(t)), \in_i(t)), \forall i=1, \ldots, d,$$

where $f_i$ are arbitrary measurable functions, $\in_i(t)$ are independent noises and ($\mathcal{P}(x_i(t))$ represents the 1 causal parents of $x_i(t)$ including both lagged and contemporaneous ones. This causal structure can also be represented by a causal graph $\mathcal{G}$ whose nodes correspond to the variables $x_i(t)$ at different time instances.

For example, the causal graph $\mathcal{G}$ (FIG. 1A shows a simple three-node graph) is a directed acyclic graph (DAG) and the causal relationships are stationary unless an anomaly occurs. According to the causal Markov factorization, the joint distribution of $x(t)=(x_1(t), x_2(t), \ldots, x_d(t))$ can be factored as:

$$\mathbb{P}[x(t)] = \prod_{i=1}^{d} \mathbb{P}[x_i(t) | \mathcal{P}(x_i(t))].$$

The local causal mechanism, corresponding to these conditional distribution terms, are known to be irrelevant to each other in a causal system. An anomaly can then be identified according to the local causal mechanism. Therefore, a point x(t) at time step t is an anomaly if there exists at least one variable $x_i$, $x_i(t)$ violates the local generating mechanism, i.e., $x_i(t)$ violates $\mathbb{P}[x_i(t)|\mathcal{P}(x_i(t))]$, which is the conditional distribution corresponding to the regular causal mechanism.

Figure 1C:
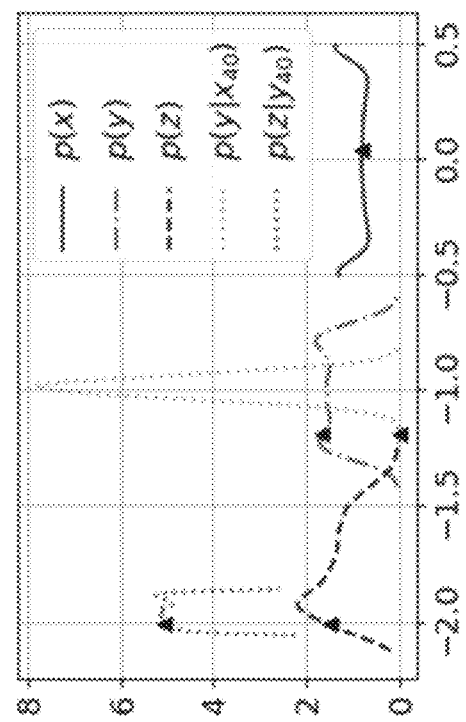
FIG. 1C is a simplified diagram illustrating example distribution of the time series variables from local causal mechanism, according to one embodiment described herein.

For example, an anomaly happens in the system if the causal mechanism between a variable and its causal parents are violated due to an anomaly event such as a system failure, e.g., the local causal effect dramatically varies (as shown in FIGS. 1B and 1C) or a big change happens on a variable and this change propagates to its children. Different from previous approaches, the anomaly detection problem can be divided into several low-dimensional subproblems based on this definition, e.g., by checking whether each variable $x_i(t)$ follows the regular conditional distribution $\mathbb{P}[x_i(t)|\mathcal{P}(x_i(t))]$.

FIG. 1B is a simplified diagram illustrating example measurements of three time series variables, according to one embodiment described herein. As shown in FIG. 1B, an anomaly labeled by a black triangle happens at time step t=40, where the causal mechanism between x and y becomes abnormal.

FIG. 1C is a simplified diagram illustrating example distribution of the time series variables from local causal mechanism, according to one embodiment described herein. Typically it is hard to find such anomaly based on the marginal distributions or the joint distribution. But from local causal 103 mechanism p(y|x), such anomaly becomes obvious, e.g., p(y|x) is much lower than its normal values. For example, the causal mechanism helps find the anomaly easily as the p-value with respect to y conditioned on x is $9 \times 10^{-5}$.

FIG. 1D is a simplified diagram illustrating an example visualization of the causal mechanism between the variables, according to one embodiment described herein.

Figure 2A:
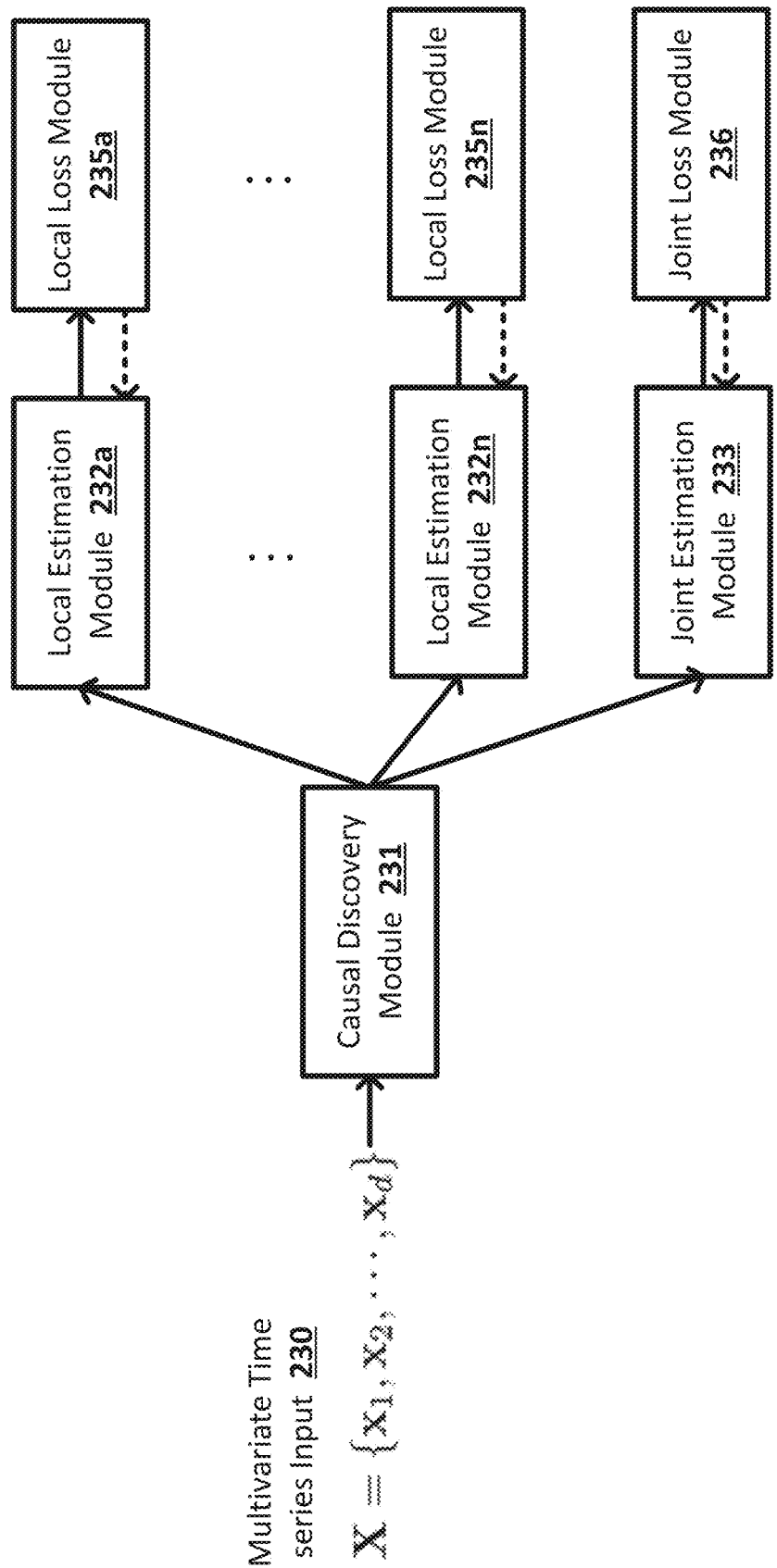
FIG. 2A is a simplified block diagram illustrating an example structure of the multivariate time series anomaly detection system at training stage, according to embodiments described herein.

FIG. 2A is a simplified block diagram illustrating an example structure of the multivariate time series anomaly detection system at training stage, according to embodiments described herein. FIG. 2A shows an unsupervised learning framework 200a where the multivariate time series data 230 X is given as the training data for learning the conditional distributions of the causal variables. Thus, the overall training objective aims to maximize the log likelihood given the observation data, i.e., maximizing:

$$L(X) = \sum_{t=1}^{T}\sum_{i=1}^{d} \log \mathbb{P}[x_i(t) | \mathcal{P}(x_i(t))].$$

In one embodiment, the multivariate time series training input 230 is input to a causal discovery module 231, which may derive a causal graph $\mathcal{G}$ based on the causal variables in the training input 230. The causal discovery module 231 may then identify a set $\mathcal{C}_R$ of variables with no causal parents in the causal graph $\mathcal{G}$.

The causal discovery module 231 may then send each variable with parents (e.g., $i \notin C_R$) to a respective local estimation module 232a-n. Each local estimation module 232a-n, represented by $\mathcal{M}_i$ is configured to model the conditional distribution of $x_i(t)$ given its causal parents, i.e., $\mathbb{P}[x_i(t)|\mathcal{P}(x_i(t))]$ is modeled via conditional density estimation, which can be learned in a supervised manner. For example, for modeling $\mathbb{P}[x_i(t)|\mathcal{P}(x_i(t))]$, kernel conditional density estimation, mixture density network, conditional VAE (CVAE) or even prediction models such as multilayer perceptron (MLP) or convolutional neural network (CNN) may be adopted. Suppose that $\mathcal{P}$ is the set of $x_i$'s causal parent variables, $\tau_j$ is the causal time lag for a parent $x_1$ and $\tau^*$ is the maximum time lag in $\mathcal{G}$. Then, the causal discovery module 231 compute:

$$\mathcal{P}*(x_i(t)) = \{x_j(t-\tau^*), \ldots, x_j(t-\tau_j) | j \in \mathcal{P}\}.$$

Note that time lag $\tau_j=0$ if $x_j$ is a contemporaneous causal parent of $x_i$. For causal parent $x_j$, more of its historical data can also be included, e.g., a window with size k: $\{x_j(t-\tau_j-k+1), \ldots, (t-\tau_j) | j \in \mathcal{P}\}$. Therefore, the problem becomes estimating the conditional distribution from the empirical observations $\{(x_i(t), c_i(t))\}_{t=1}^T$ where $c_i(t) = \mathcal{P}*(x_i(t))$. CVAE may be applied to model such conditional distribution, which has an empirical variational lower bound of:

$$L(x, c; \theta, \phi) = \frac{1}{n}\sum_{k=1}^{n} \log p_\theta(x|c, z_k) - KL(q_\phi(z|x,c) \| p_\theta(z|c)),$$

where $g_\phi(z|x, c)$, $p_\theta(x|c, z_k)$ are MLPs and $p_\theta(z|c)$ is a Gaussian distribution. Given $(x_i(t), c_i(t))$, CVAE outputs $\hat{x}_i(t)$—the reconstruction of $x_i(t)$, then $\mathbb{P}[x_i(t)|c_i(t)]$ is measured by the distribution of the estimation error $|\hat{x}_i(t) - x_i(t)|$.

The output conditional distribution from each local estimation module 232a-n is then input to a local loss module 235a-n, respectively. For example, each local loss module 235a-n may compute a loss objective based on the conditional distribution $\mathbb{P}[x_i(t)|\mathcal{P}(x_i(t))]$ and the ground-truth label $\{x_i(t), \mathcal{P}(x_i(t))\}$. Each loss is used to update each local loss module 235a-n via backpropagation (e.g., as shown by the dotted line), respectively.

In one embodiment, the causal discovery module 231 may send variables with no parents (i∈ $C_R$) to a joint estimation module 233, which is configured to predict the joint distribution $\prod_{i \in C_R} \mathbb{P}[x_i(t)]$ by applying any existing method for modeling univariate or multivariate time series with the historical data $H_i(t)=\{x_i(1), \ldots, x_i(t-1)\}$ of $x_i$. Specifically, for modeling $\prod_{i \in C_R} \mathbb{P}[x_i(t)]$, the estimation of this distribution is to handle each variable in $C_R$ individually via univariate time series models, e.g., Autoregressive Integrated Moving Average (ARIMA) (described Hamilton, *Time series analysis*, Princeton University Press, 1994), Seasonal Autoregressive Integrated Moving Average (SARIMA) (described in Hyndman et al., Forecasting: Principles and Practice, OTexts, 2$^{nd}$ edition, 2018), convolutional neural network (CNN) (described in Binkowski et al., Autoregressive convolutional neural networks for asynchronous time series, in Proceedings of the 35th International Conference on Machine Learning, volume 80 of PMLR, pp. 580-589, PMLR, 2018).

In another example, the variables in $C_R$ may be handled together by utilizing the models for multivariate time series anomaly detection, e.g., Isolation Forest (IF) (described in Liu et al., Isolation Forecast, in proceedings of 2008 IEEE international conference on data mining, pp. 413-422, 2008), autoencoders (described in Baldi, Autoencoders, unsupervised learning, and deep architectures, in proceedings of ICML Workshop on Unsupervised and Transfer Learning, volume 27 of PMLR, pp. 37-49, PMLR, 2012), LSTM-VAE (described in Park et al., A multimodal anomaly detector for robot-assisted feeding using an LSTM-based variational autoencoder, IEEE Robotics and Automation Letters, PP. 11, 2017).

The training data for such model includes all the observations of the variables in $C_R$, i.e., $\{x_i(t)|i\in C_R, t=1, \ldots, T\}$. For example, the training data for a forecasting based method is $\{(x_i(t), \{x_i(t-k), \ldots, x_i(t-1)\})|i\in C_R, t=1, \ldots, T\}$ where $x_i(t)$ is predicted by a window of its previous data points.

In one scenario, the framework 200a may coincide with the traditional univariate/multivariate time series anomaly detection approaches if the causal graph is empty, i.e., no causal relationships are considered. When the causal relationships are available obtained by domain knowledge or data-driven causal discovery techniques, framework 200a can easily utilize such information and reduces the efforts in joint distribution estimation.

In this way, the joint estimation module 233 leverages the state-of-the-art time series models. The joint distribution is then input to the joint loss module 236 to compute a joint loss, e.g., based on ground-truth $\{x_i(t)|i\in C_R\}$. The join loss can then be used to update the joint estimation module 233.

In one embodiment, the joint estimation module 233 can be one multivariate model, or a number $|C_R|$ of univariate models operated in parallel.

Figure 2B:
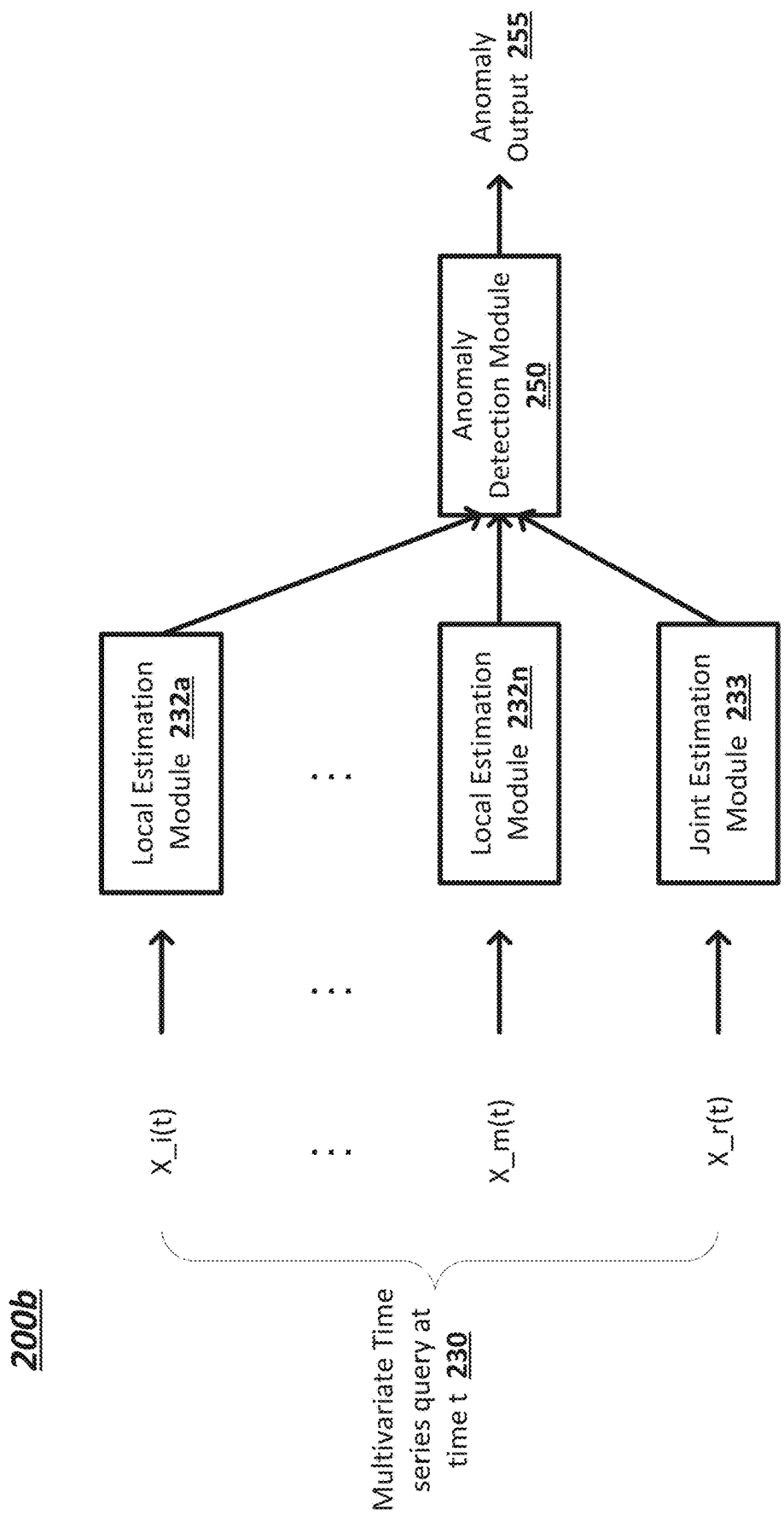
FIG. 2B is a simplified block diagram illustrating an example structure of the multivariate time series anomaly detection system at inference stage, according to embodiments described herein.

FIG. 2B is a simplified block diagram illustrating an example structure of the multivariate time series anomaly detection system at inference stage, according to embodiments described herein. As described in FIG. 2A, the training framework 200a generates the causal graph and the trained models 232a-n and 233 for estimating the conditional distributions of the local causal mechanism. In FIG. 2B, the inference stage framework 200b for multivariate anomaly detection is depicted.

At time t, a multivariate time series query x(t) 230 may be received. According to the causal graph $\mathcal{G}$ and subset $C_R$ of causal variables having no causal parents that are identified during training stage, variables in the query x(t) 230 that do not belong to the subset $C_R$ are each input to a respective local estimation module 232a to generate an estimation of the conditional distribution $\mathbb{P}[x_i(t)|\mathcal{P}(x_i(t))]$, represented by $\mathcal{M}_i(x(t))$. Variables in the query x(t) 230 that belong to the subset $C_R$ are input to a joint estimation module 233 to generate an estimation of the joint distribution $\prod_{i \in C_R} \mathbb{P}[x_i(t)]$ represented by $\mathcal{M}_R(x(t))$. $\mathcal{M}_R(x(t))$ outputs one value if a multivariate model is applied or $|C_R|$ values if a univariate model is applied for each dimension.

The output distributions from the modules 232a-n and 233 are then input to the anomaly detection module 250 to compute an anomaly score as one minus the minimum value of these estimated probabilities:

$$\mathbb{A}_{(x(t))} = 1 - \min\{\{\mathcal{M}_i(x(t))|i \notin C_R\}, \mathcal{M}_R(x(t))\}.$$

A point is labeled as an anomaly if its anomaly score is larger than a certain threshold, and thus the anomaly output 255 can be generated.

In one embodiment, framework 200b may be extended for root cause analysis for the anomaly, which identifies root causes while alerting anomalies in multivariate time series. Because of the modularity property implied in the anomaly definition, framework 200b can be used to identify the root causes when an anomaly event occurs. For example, the root causes of an anomaly point x(t) are those variables $x_i$ such that $x_i(t)$ violates $\mathbb{P}[x_i(t)|\mathcal{P}(x_i(t))]$, e.g., an anomaly happens on the local causal mechanism related to those variables. This definition indicates that $x_i$ is one of the root causes if the local causal mechanism of variable $x_i(t)$ is violated. In the example shown in FIGS. 1A-1D, the causal mechanism between y and z is normal while the causal mechanism between x and y is violated. This anomaly will be detected by the model $\mathcal{M}_1$ which estimates the conditional distribution p(y|x). Thus, variable y must be the root cause. Based on this principle, the root causes can be identified in the anomaly detection approach, i.e., for variable $x_i$, defining its root cause score at time t by $$\mathbb{S}_{(x_i(t))} = 1 - \hat{\mathbb{P}}[x_i(t)] \text{ if } i \in \mathcal{C}_R \text{ or } 1 - \hat{\mathbb{P}}[x_i(t)|\mathcal{P}(x_i(t))] \text{ otherwise,}$$

where $\hat{\mathbb{P}}[x_i(t)]$ and $\hat{\mathbb{P}}[x_i(t)|\mathcal{P}(x_i(t))]$ are computed by $\mathcal{M}_R$ and $\mathcal{M}_i$, respectively. The root causes at time t can be identified by picking the variables with top root cause scores.

Figure 3B:
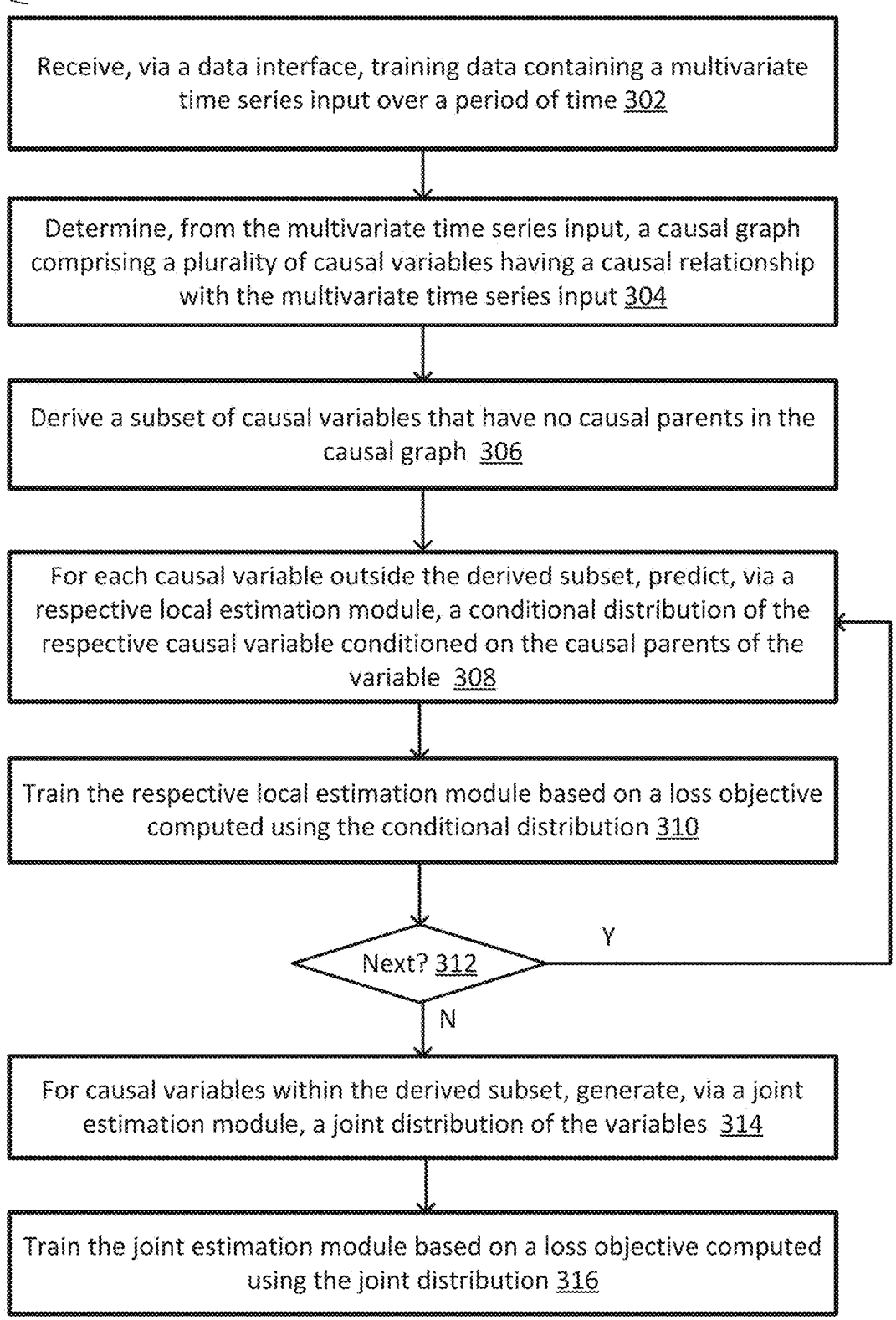
FIGS. 3B-3C is a simplified logic flow diagram illustrating an example process of the multivariate time series anomaly detection system at training stage, according to embodiments described herein.

FIG. 3A is a simplified diagram illustrating pseudo-code for a causality-based anomaly detection algorithm, according to embodiments described herein. Algorithm 1 outlines the causality-based anomaly detection approach which includes causal graph discovery, conditional distribution estimation and anomaly detection. The training procedure generates the causal graph and the trained models for estimating the conditional distributions of the local causal mechanism. During the anomaly detection phase, an anomaly score is generated as one minus the minimum value of the estimated probabilities. Further details of Algorithm 1 is discussed the work flows described in FIGS. 3B-3C.

FIG. 3B is a simplified logic flow diagram illustrating an example process 300 of the multivariate time series anomaly detection system at training stage, according to embodiments described herein. One or more of the processes of method 300 may be implemented, at least in part, in the form of executable code stored on non-transitory, tangible, machine-readable media that when run by one or more processors may cause the one or more processors to perform one or more of the processes. In some embodiments, method 300 corresponds to the operation of the causality-based anomaly detection module 430 (FIG. 4) to perform the task of training a network for causality-based anomaly detection.

At step 302, the system may receive, via a data interface, training data containing a multivariate time series input (e.g., the multivariate time series data 230 in FIG. 2A) over a period of time.

At step 304, the system may determine, from the multivariate time series input, a causal graph $\mathcal{G}$ (e.g., the three-node graph in FIG. 1A) comprising a plurality of causal variables having a causal relationship with the multivariate tie series input. For example, a random graph may be generated from the multivariate time series variables having a number of nodes and edge creation probabilities. The random graph may then be converted into a directed acyclic graph. A linear or nonlinear relationship for a node with parent nodes in the directed acyclic graph may then be generated.

At step 306, the system may derive a subset $\mathcal{C}_R$ of causal variables that have no causal parents in the causal graph $\mathcal{G}$.

The causal discovery module 231 is configured to discover causal information by analyzing pure observational data such as the multivariate time series input 230. In one implementation, the causal discovery module 231 may adopt causal discovery algorithms such as PC (described in Spirtes et al., An algorithm for fast recovery of sparse causal graphs, Social Science Computer Review, 9(1):62-72, 1991), FGES (described in Chickering, Learning equivalence classes of Bayesian-network structures, Journal of Machine Learning Res., 2(3):445-498, 2002), PCMCI+(described in Runge et al., Detecting and quantifying causal associations in large nonlinear time series datasets. Science Advances, 5(11), 2019), depending on whether temporal data (with time-delayed causal relations) is available and whether the causal relations are linear or nonlinear. For example, FGES with SEM-BIC score may be implemented if the variables are linearly related and FGES with generalized score function (described in Huang et al., Generalized score functions for causal discovery, in Proceedings of the 24th ACM SIGKDD International Conference on Knowledge Discovery & Data Mining, KDD '18, pp. 1551-1560, 2018) may be implemented if they are non-linearly correlated.

At step 308, the system may, for each causal variable outside the derived subset, predict, via a respective local estimation module, a conditional distribution of the respective causal variable conditioned on the causal parents of the variable. For example, the conditional distribution of the respective causal variable conditioned on causal parents of the respective causal variable is generated by estimating a conditional distribution from empirical observations of the respective causal variable and corresponding causal parents with a causal time lag.

At step 310, the system may train the respective local estimation module based on a loss objective computed using the conditional distribution.

At step 312, the system may proceed to the next local estimation module if there is another variable not in the subset and repeat at step 308. Otherwise, the process 300 proceeds to step 314.

At step 314, for causal variables within the derived subset, the system may generate, via a joint estimation module, a joint distribution of the variables. For example, the joint distribution of the causal variables is generated based on observations of causal variables in the subset over a window of previous time steps.

At step 316, the system may train the joint estimation module based on a loss objective computed using the joint distribution.

Figure 3C:
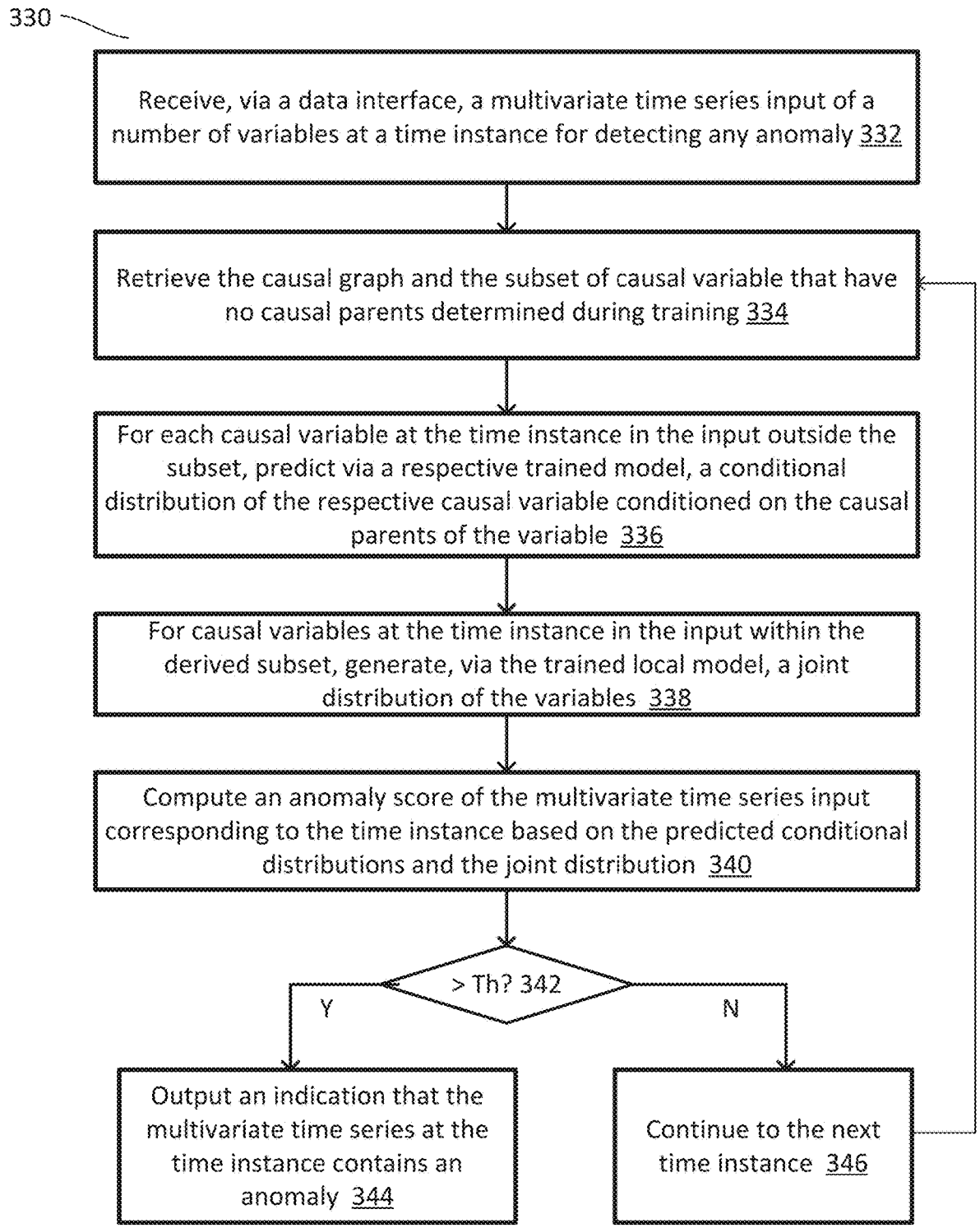

FIG. 3C is a simplified logic flow diagram 330 illustrating an example process of the multivariate time series anomaly detection system at inference stage, according to embodiments described herein.

At step 332, the system may receive, via a data interface, a multivariate time series input of a number of variables at a time instance for detecting any anomaly.

At step 334, the system may retrieve the causal graph and the subset of causal variable that have no causal parents determined during training.

At step 336, the system may, for each causal variable at the time instance in the input outside the subset, predict via a respective trained model, a conditional distribution of the respective causal variable conditioned on the causal parents of the variable.

At step 338, the system may, for causal variables at the time instance in the input within the derived subset, generate, via the trained local model, a joint distribution of the variables.

At step 340, the system may compute an anomaly score of the multivariate time series input corresponding to the time instance based on the predicted conditional distributions and the joint distribution. For example, the anomaly score is computed as one minus a minimum value of the second conditional distributions and the second joint distribution.

At step 342, it is determined whether the anomaly score is greater than a pre-defined threshold. If yes, process 330 proceeds to step 344, at which the system outputs an indication that the multivariate time series at the time instance contains an anomaly. Otherwise, if the anomaly score is not greater than the threshold, at step 346, the system continues to the next time instance, and the process 330 repeats from step 334.

In one embodiment, two learning procedures, causal graph learning and anomaly detection, may be implemented iteratively. For example, after the local estimation modules $\mathcal{M}_i$'s and the joint estimation module $\mathcal{M}_R$ are trained after a certain number of epochs in steps 308-316, the anomalies detected by the trained local estimation modules $\mathcal{M}_i$'s and the trained joint estimation module $\mathcal{M}_R$ are removed from the training data. The causal graph may be re-estimated based on the "refined" training data. In this way, the impact of missing or incorrect causal links in the inferred causal graph may be reduced over time.

Figure 4:
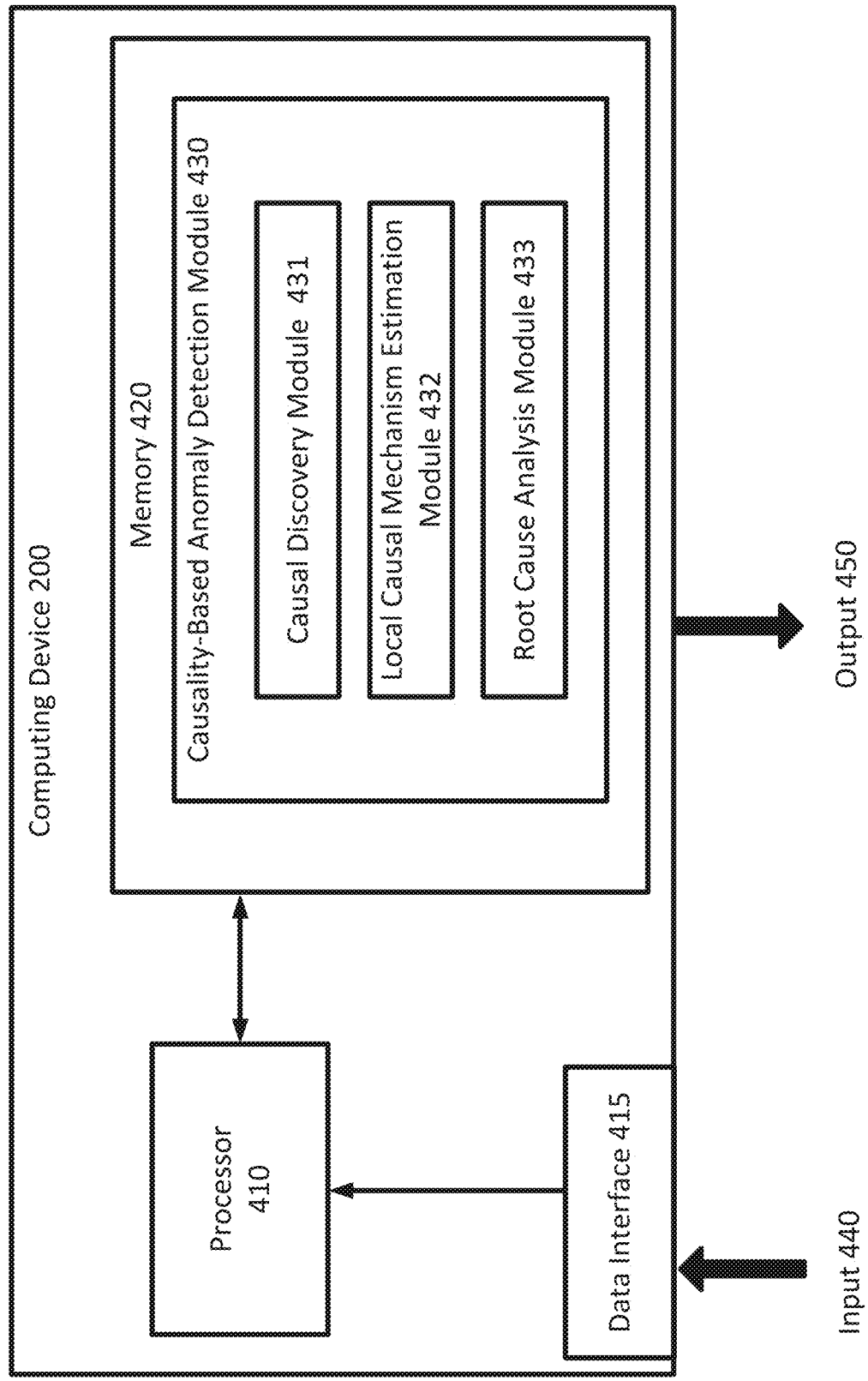
FIG. 4 is a simplified diagram of a computing device 400 that implements the causality-based anomaly detection, according to some embodiments described herein.

FIG. 4 is a simplified diagram of a computing device 400 that implements the causality-based anomaly detection, according to some embodiments described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a causality-based anomaly detection module 430 that may be used to implement and/or emulate the systems and models, and/or to implement any of the methods described further herein. In some examples, the causality-based anomaly detection module 430, may receive an input 440, e.g., such as multivariate time series data from a target system, via a data interface 415. The data interface 415 may be any of a user interface that receives a user uploaded data, or a communication interface that may receive or retrieve a previously stored data instance of form from the database. The causality-based anomaly detection module 430 may generate an output 450, such as a detection of anomaly.

In some embodiments, the causality-based anomaly detection module 430 may further includes the causal discovery module 431, local causal mechanism estimation module 432, and a root cause analysis module 433. The causal discovery module 431 is configured to explore the causal structure underling the input data 440. The local causal mechanism estimation module 432 is configured to model the joint distribution representing local causal mechanism. For example, the local causal mechanism estimation module 432 includes $\mathcal{M}_i$'s 232a-n and $\mathcal{M}_R$ 233. The root cause analysis module 433 is configured to identify the root cause when an anomaly event occurs.

In one embodiment, the module 430 and its submodules 431-433 may be implemented via hardware, software or a combination of both.

Some examples of computing devices, such as computing device 400 may include non-transitory, tangible, machine readable media that include executable code that when run by one or more processors (e.g., processor 410) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Performance

Data experiments for performance valuation include: 1) evaluating frameworks 200a-b and methods 300 and 330 with simulated datasets and public datasets, 2) evaluating how much the inferred causal relationships help in anomaly detection, 3) analyzing how different causal graphs affect the performance, 4) a case study demonstrating the application of frameworks 200a-b and methods 300 and 330 for real-world anomaly detection in AIOps.

The anomaly detection performance is assessed by the precision, recall and F1-score metrics in a point-adjust manner, i.e., all the anomalies of an anomalous segment are considered as correctly detected if at least one anomaly of this segment is correctly detected while the anomalies outside the ground truth anomaly segment are treated as usual. FGES and PC are applied to discover the causal graph. For $\mathcal{M}_i$'s, CVAE is used. For $\mathcal{M}_R$, the univariate model and other methods such as Isolation Forest, AutoEncoders, LSTM-VAE are adopted.

Simulation dataset are generated as follows: 1) generating an Erdös Rényi random graph $\mathcal{G}$ with number of nodes n and edge creation probability p, then convert it into a DAG. 2) For the nodes with no parents in $\mathcal{G}$, randomly picking a signal type from "harmonic", "pseudo periodic" and "autoregressive" and generating a time series with length T ac ding to this type. 3) For a node $x_i$ with parents, linear relationship $x_i = \Sigma_{j \in \mathcal{P}(x_i)} w_j x_j + \in$ and nonlinear relationship $x_i = \Sigma_{j \in \mathcal{P}(x_i)} w_j \tanh(x_j) + \in$ where $w_j$ is uniformly sampled from [0.5, 2.0] and $\in$ is uniformly sampled from [−0.1, 0.1]. The time series for those nodes are generated in a topological order.

The next step is to add anomalies into the generated time series. Three types of anomalies are considered. The first one is a "measurement" anomaly where the causal mechanism is normal but the observation is abnormal due to measurement errors, i.e., randomly pick a node xi, a time step t and a scale s (uniformly sampled from [0, 3]), and then set $x_i(t) = [x_i(t) - \text{median}(x_i)]*s + \text{median}(x_i)$. The second one is an "intervention" anomaly, i.e., after generating anomalies for some nodes, those anomaly values propagate to the children nodes according to the causal relationships. The third one is an "effect" anomaly where anomalies only happen on the nodes with no causal children.

In the experiments, six settings are derived from the combinations of "linear/nonlinear" and 237 "measurement/intervention/effect". The simulated time series has 15 variables with length 20000, where the first half is the training data and the rest is the test data. The percentage of anomalies is about 10%. FIG. 5 shows the performance of different unsupervised multivariate time series anomaly detection methods with the generated simulated dataset. Clearly, methods 300 and 330 outperforms all the other methods. It achieves significantly better F1 scores when 242 the relationships are nonlinear or the anomaly type is "intervention", e.g., the causality-based method described herein obtains F1 score 0.759 243 for the "nonlinear, intervention" setting, while the best F1 score achieved by the others is 0.589. In the "linear, measurement/effect" setting, DAGMM has a similar performance with ours because the data can be modeled well by applying dimension reduction followed by a Gaussian mixture model. But when the relationships become nonlinear, it becomes harder for DAGMM to model the data. This experiment shows that the causal mechanism plays an important role in anomaly detection. Modeling joint distribution without considering causality can lead to a significant performance drop.

Five public real datasets were used in data experiments: 1) Server Machine Dataset (SMD) (Su et al., Robust anomaly detection for multivariate time series through stochastic recurrent neural network, in 25th ACM SIGKDD Intl Conference on Knowledge Discovery & Data Mining, KDD'19, pp. 2828-2837, 2019): It contains data from 28 server machines monitored by 33 metrics, 2) Secure Water Treatment (SWaT) (Mathur et al., Swat: a water treatment testbed for research and training on ics security, in 2016 International Workshop on Cyber-physical Systems for Smart Water Networks (CySWater), pp. 31-36, 2016): it consists of 11 days of continuous operation, i.e., 7 days collected under normal 253 operations and 4 days collected with attack scenarios, 3) Water Distribution (WADI) (Marthur et al): It consists of 16 days of continuous operation, of which 14 days were collected under normal operation and 2 days with attack scenarios. 4) Soil Moisture Active Passive (SMAP) satellite and Mars Science Laboratory (MSL) rover Datasets (Hundman et al., Detecting spacecraft anomalies using LSTMs and nonparametric dynamic thresholding, in 24th ACM SIGKDD Intl Conf. on Knowledge Discovery & Data Mining, pp. 387-395, 2018), which are two real public datasets expert-labeled by NASA.

The causality-based approach is compared with seven unsupervised approaches, e.g., autoencoders, DAGMM (described in Zong et al., Deep autoencoding gaussian mixture model for unsupervised anomaly detection, in International Conference on Learning Representations, 2018), OmniAnomaly (described in Su et al.), USAD (Audibert et al., USAD: Unsupervised anomaly detection on multivariate time series, in The 26th ACM SIGKDD Intl Conference on Knowledge Discovery & Data Mining, KDD'20, pp. 3395-3404, 2020).

FIG. 6 shows the results on three representative datasets where the results of OmniAnomaly are copied from the paper Audibert et al. Overall, IF, AE, VAE and DAGMM have relatively lower performance because they neither exploit the temporal information nor leverage the causal relationships between those variables. LSTM-VAE, OmniAnomaly and USAD perform better than these four methods since they utilize the temporal information via modeling the current observations with the historical data. The causality-based approach exploits the causal relationships besides the temporal information, achieving significantly better results than the other methods in 4 out of 5 datasets including SWaT and WADI, e.g., ours has the best F1 score 0.918 267 for SWaT and 0.818 for WADI, while the best F1 scores for SWaT and WADI by other methods are 268 0.846 and 0.767, respectively. The causality-based approach also outperforms the others in SMAP and MSL. For the SMD dataset, LSTM-VAE achieves the best F1, and the causality-based approach achieves a competitive F1 score and the best recall of 99.9%. We conjecture one possible reason why LSTM-VAE has better F1 than the causality-based approach is that the causality-based approach may find more true anomalies that are abnormal in terms of causal mechanism, but not labeled as anomalies in the dataset.

Ablation experiment has been conducted to evaluate the effect of the causal information on anomaly detection. For an anomaly detection method A such as IF and AE, it is compared with the causality approach+A that uses CVAE for $\mathcal{M}_i$ and A for $\mathcal{M}_R$, where $\mathcal{M}_i$ and $\mathcal{M}_R$ estimate $\mathbb{P}[x_i(t) | \mathcal{P}(x_i(t))]$ and $\Pi_{i \in C_R} \mathbb{P}[x_i(t)]$ respectively. The metrics as mentioned above are reported and the best metrics achieved by choosing the best thresholds in the test datasets.

FIG. 7 shows the performance of our approach with different $\mathcal{M}_R$, where $\mathcal{M}_R = \emptyset$ means that the anomalies are detected by $\mathcal{M}_1$ only without using $\mathcal{M}_R$. By comparing this table with FIG. 5, it is observed that the "causality-based approach+A" performs much better than using A only, e.g., "causality-based approach+AE" achieves F1 score 282 0.928 for SWaT and 0.850 for WADI, while AE obtains 0.792 for SWaT and 0.668 for WADI. If $\mathcal{M}_R$ is not used in anomaly detection, a performance drop in terms of F1 score. For example, the best F1 score drops from 0.944 to 0.940 for SWaT and from 0.934 to 0.923 for WADI. The reason why $\mathcal{M}_R$ doesn't affect the performance much for SWaT is that there are only 5 variables in the inferred causal graph $\mathcal{G}$ with no parents, meaning that the models $\mathcal{M}_1$ dominate in detection.

The effects of different parameters for discovering causal graphs on the performance of the causality-based approach are also studied. The parameters investigated are "max degree" and "penalty discount" in FGES, both of which affect the structure of the causal graph, e.g., sparsity, indegree, outdegree. In this experiment, 6 different "max degree" {5, 6, 7, 8, 9, 10} and 6 different "penalty discount" {20, 40, 60, 80, 100, 120}. Smaller "max degree" or larger "penalty discount" leads to more sparse graphs with less edges, e.g., for SWaT, the number of the edges in G is {70, 79, 88, 95, 98, 102} when "max degree"={5, 6, 7, 8, 9, 10}, respectively.

FIGS. 8A-8D plot the detection precision, recall and F1 score obtained with different "max degree" and "penalty discount". For SWaT, these two parameters don't affect the performance much. For WADI, when "max degree" decreases (the causal graph becomes more sparse) or "penalty discount" decreases (the causal graph has more false positive links), the performance also decreases but it doesn't drop much, i.e., the worst F1 score is still above 0.65. When "max degree">6 and "penalty discount">40, e.g., the F1 score is around 0.8, showing that the causality-based approach is robust to the changes of the inferred causal graph.

Another experiment is to apply the causality-based method for a real-world anomaly detection task in AIOps, where the goal is to monitor the operational key performance indicator (KPI) metrics of database services for alerting anomalies and identifying root causes in order to automate remediation strategies and improve database availability in cloud-based services. In this application, a total of 61 time series variables are monitored measuring the KPI metrics of database services, e.g., read/write IO requests, CPU usage, DB time. The data in this case study consists of the latest one-month measurements.

Figure 9:
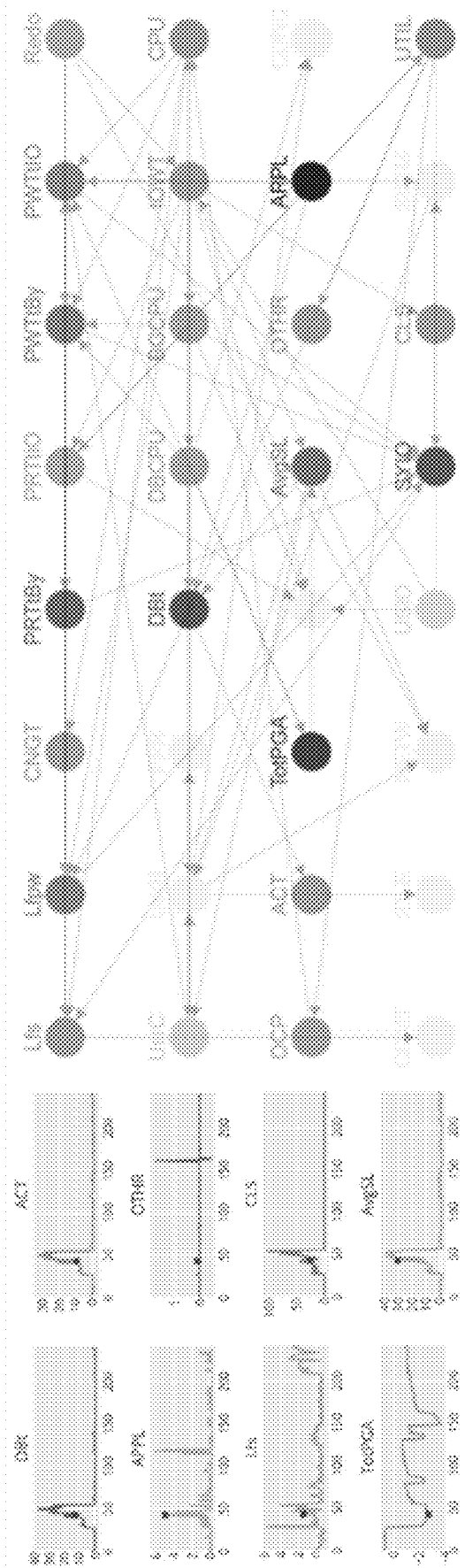

The incidences that happened are relatively rare, e.g., 2 major incidences one month, and our anomaly detection approach correctly detect these incidences. Therefore, the root cause analysis are focused on in this case study. FIG. 9 shows an example of one major incidence, showing several abnormal metrics such as DBt (DB time), Lfs (log file sync), APPL (application), TotPGA (total PGA allocated) and a part of the causal graph. The root cause scores computed by our method are highlighted. It is observed that the top root causes metrics are APPL, DBt and TotPGA, all of which correspond to application or database related issues for the incident as validated by domain experts.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for detecting anomalies in a computer system, the method comprising:
   receiving, via a communication interface, training data including multivariate time series variables indicating system anomalies that occurred in the computer system over a period of time;
   transforming the multivariate time series variables into a causal graph comprising a plurality of causal variables having a causal relationship;
   deriving a subset of causal variables having no causal parents in the causal graph from the plurality of causal variables;
   training, for each causal variable outside the derived subset, a respective local estimation neural network model implemented on one or more hardware processors, using the transformed causal graph, wherein the training comprises predicting a first conditional distribution of the respective causal variable conditioned on causal parents of the respective causal variable;
   training, for causal variables that belong to the derived subset, a joint estimation neural network model implemented on the one or more hardware processors, using the transformed causal graph, wherein the training comprises predicting a joint distribution of the causal variables that belong to the derived subset; and
   storing, at a memory, updated parameters of the trained local estimation neural network models and the trained joint estimation neural network model for multivariate time series anomaly detection; and
   generating, using the trained local estimation neural network models and the trained joint estimation neural network model, a predicted system anomaly in response to a multivariate input depicting operation characteristics of the computer system.

2. The method of claim 1, wherein the respective local estimation model is trained by:
   computing a loss objective based on the first conditional distribution of the respective causal variable conditioned on causal parents of the respective causal variable and the respective causal variable; and
   updating the respective local estimation model based on the loss objective via backpropagation.

3. The method of claim 1, wherein the estimation model is trained by:
   computing a loss objective based on the predicted joint distribution of the local variables and the causal variables that belong to the derived subset; and
   updating the joint estimation model based on the loss objective via backpropagation.

4. The method of claim 1, further comprising:
receiving, at the communication interface, a multivariate time series input comprising a number of variables at a time instance for anomaly detection; and
retrieving the causal graph and the subset of causal variables that were previously determined during training.

5. The method of claim 4, further comprising:
predicting, via the respective trained local estimation model, a second respective conditional distribution of the respective causal variable in the multivariate time series input conditioned on a set of causal parents of the respective causal variable; and
predicting, via the trained joint estimation model, a second joint distribution of causal variables from the multivariate time series input that belong to the subset.

6. The method of claim 5, further comprising:
computing an anomaly score for the multivariate time series input at the time instance based on the second conditional distributions and the second joint distribution; and
outputting an indication that the multivariate time series at the time instance contains an anomaly in response to determining that the anomaly score is greater than a pre-defined threshold.

7. The method of claim 6, wherein the anomaly score is computed as one minus a minimum value of the second conditional distributions and the second joint distribution.

8. The method of claim 1, wherein the causal graph is created by:
generating a random graph from the multivariate time series variables having a number of nodes and edge creation probabilities;
converting the random graph into a directed acyclic graph; and
generating a linear or nonlinear relationship for a node with parent nodes in the directed acyclic graph.

9. The method of claim 1, wherein the first conditional distribution of the respective causal variable conditioned on causal parents of the respective causal variable is generated by estimating a conditional distribution from empirical observations of the respective causal variable and corresponding causal parents with a causal time lag.

10. The method of claim 1, wherein the joint distribution of the causal variables is generated based on observations of causal variables in the subset over a window of previous time steps.

11. A system for detecting anomalies in a computer system, the system comprising:
a communication interface that receives training data including multivariate time series variables indicating system anomalies that occurred in the computer system over a period of time;
a memory storing local estimation models and a joint estimation model and a plurality of processor-executable instructions; and
a processor executing the instructions to perform operations comprising:
transforming, from the multivariate time series variables into a causal graph comprising a plurality of causal variables having a causal relationship;
deriving a subset of causal variables having no causal parents in the causal graph from the plurality of causal variables;
training, for each causal variable outside the derived subset, a respective local estimation neural network model implemented on one or more hardware processors, using the transformed casual graph, wherein the training comprises predicting a first conditional distribution of the respective causal variable conditioned on causal parents of the respective causal variable;
training, for causal variables that belong to the derived subset, a joint estimation neural network model implemented on the one or more hardware processors, using the transformed causal graph, wherein the training comprises predicting a joint distribution of the causal variables that belong to the derived subset; and
storing, at the memory, updated parameters of the trained local estimation neural network models and the trained joint estimation neural network model for multivariate time series anomaly detection; and
generating, using the trained local estimation neural network models and the trained joint estimation neural network model, a predicted system anomaly in response to a multivariate input depicting operation characteristics of the computer system.

12. The system of claim 11, wherein the respective local estimation model is trained by:
computing a loss objective based on the first conditional distribution of the respective causal variable conditioned on causal parents of the respective causal variable and the respective causal variable; and
updating the respective local estimation model based on the loss objective via backpropagation.

13. The system of claim 11, wherein the joint estimation model is trained by:
computing a loss objective based on the predicted joint distribution of the local variables and the causal variables that belong to the derived subset; and
updating the joint estimation model based on the loss objective via backpropagation.

14. The system of claim 11, wherein the operations further comprise:
receiving, at the communication interface, a multivariate time series input comprising a number of variables at a time instance for anomaly detection; and
retrieving the causal graph and the subset of causal variables that were previously determined during training.

15. The system of claim 4, wherein the operations further comprise:
predicting, via the respective trained local estimation model, a second respective conditional distribution of the respective causal variable in the multivariate time series input conditioned on a set of causal parents of the respective causal variable; and
predicting, via the trained joint estimation model, a second joint distribution of causal variables from the multivariate time series input that belong to the subset.

16. The system of claim 15, wherein the operations further comprise:
computing an anomaly score for the multivariate time series input at the time instance based on the second conditional distributions and the second joint distribution; and
outputting an indication that the multivariate time series at the time instance contains an anomaly in response to determining that the anomaly score is greater than a pre-defined threshold.

17. The system of claim 16, wherein the anomaly score is computed as one minus a minimum value of the second conditional distributions and the second joint distribution.

18. The system of claim 11, wherein the causal graph is created by:
  generating a random graph from the multivariate time series variables having a number of nodes and edge creation probabilities;
  converting the random graph into a directed acyclic graph; and
  generating a linear or nonlinear relationship for a node with parent nodes in the directed acyclic graph.

19. The system of claim 11, wherein the first conditional distribution of the respective causal variable conditioned on causal parents of the respective causal variable is generated by estimating a conditional distribution from empirical observations of the respective causal variable and corresponding causal parents with a causal time lag.

20. The system of claim 11, wherein the joint distribution of the causal variables is generated based on observations of causal variables in the subset over a window of previous time steps.

* * * * *